United States Patent
Rutledge et al.

(10) Patent No.: US 9,735,723 B2
(45) Date of Patent: Aug. 15, 2017

(54) METHOD TO CONTROL A SWITCHED RELUCTANCE MOTOR

(71) Applicant: Perkins Engines Company Limited, Peterborough (GB)

(72) Inventors: John Rutledge, Peterborough (GB); Stephen Watkins, Leeds (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 15/221,924

(22) Filed: Jul. 28, 2016

(65) Prior Publication Data

US 2017/0033719 A1 Feb. 2, 2017

(30) Foreign Application Priority Data

Jul. 28, 2015 (EP) ..................................... 15178610

(51) Int. Cl.
| | |
|---|---|
| *H02P 25/08* | (2016.01) |
| *H02P 25/092* | (2016.01) |
| *H02P 6/18* | (2016.01) |
| *H02P 23/00* | (2016.01) |
| *H02P 25/089* | (2016.01) |

(52) U.S. Cl.
CPC ............ *H02P 25/092* (2016.02); *H02P 6/186* (2013.01); *H02P 23/0031* (2013.01); *H02P 25/089* (2016.02)

(58) Field of Classification Search
CPC .... H02P 25/08; H02P 6/00; H02P 6/12; H02P 6/14; H02P 3/00; H02P 7/00; H02P 8/00; H02P 1/46; H02P 3/18; H02P 23/00; H02P 25/00

USPC ......... 318/400.01, 400.14, 400.15, 700, 701, 318/721, 779, 799, 800, 801, 430, 432, 318/437, 490, 503, 504, 807; 388/800, 388/901, 909; 363/40, 44, 95, 120, 174, 363/175
See application file for complete search history.

(56) References Cited

U.S. PATENT DOCUMENTS 5,793,179 A * 8/1998 Watkins ................ H02P 25/089
318/701

FOREIGN PATENT DOCUMENTS

| EP | 0780966 B1 | 3/2000 |
|---|---|---|
| EP | 2721075 A1 | 3/2014 |

OTHER PUBLICATIONS

European Patent Office, European Search Report in European Patent Application No. 15178610, Jan. 11, 2016, 3 pp.

* cited by examiner

*Primary Examiner* — Anthony M Paul

(57) ABSTRACT

A method to control the rotor position in a reluctance motor includes: energizing a phase winding to an energized state so as to move a rotor relative to a stator; switching the phase winding between the energized state and a freewheeling state over a pulsing period to produce a plurality of phase current pulses wherein the phase current freewheels in the freewheeling state over a freewheeling period of each current pulse; sampling rates of change of phase current and amplitudes of phase current during a plurality of freewheeling periods; de-energizing the phase winding; and computing the angular position of the rotor.

15 Claims, 5 Drawing Sheets

METHOD TO CONTROL A SWITCHED RELUCTANCE MOTOR

CROSS-REFERENCE TO RELATED APPLICATIONS

This application which claims priority to European Patent Application No. EP 15178610.0, filed Jul. 28, 2015, which is incorporated by reference herein in its entirety for all purposes.

TECHNICAL FIELD

This disclosure relates to the field of sensorless monitoring and control of rotor position in a reluctance motor; in particular to switched reluctance motors and more particularly to low speed switched reluctance motors, and even more particularly to low speed switched reluctance motors having a phase current that is constrained by chopping.

BACKGROUND

The accurate timing of the excitation of phases with respect to rotor position, in a switched reluctance motor, may be an important factor to obtain optimal performance. Rotor position sensors may be widely used in switched reluctance motors for monitoring rotor position. Such monitoring may be conventionally performed by an optical or magnetic sensor detecting a feature mounted on the rotor or motor shaft. Control of the rotor position in the reluctance motor may be based on data relating to the rotor position.

To avoid dependency upon sensors, sensorless monitoring and control methods have been developed. Sensorless monitoring methods of switched reluctance motors may include signal injection methods and direct phase measurement methods.

Signal injection methods may rely on diagnostic energisation pulses, for example non-torque producing pulses, that allow the controller to monitor the diagnostic current and accordingly the variation in inductance, from which the rotor position can be computed. In general, signal injection methods may be useful at starting and low operating speeds, but may adversely impact the motor performance at higher operating speeds.

Direct phase measurement methods may rely on monitoring phase current and voltage in order to determine the rotor position. A direct phase measurement method may use the concept of phase current freewheeling. Phase current freewheeling may be produced in a switched reluctance motor by setting voltage across a phase winding to zero for a period of time. During the freewheeling period current may circulate around the winding and the flux may be constant.

EP0780966B1 describes a method of sensorless rotor position monitoring in reluctance machines. The method comprises determining the rate of change of current at a particular point at which current in the winding may be arranged to freewheel. The point may coincide with alignment of a rotor and a stator pole such that the rate of change of current is predicted to be zero. The magnitude and polarity of any variation from the predicted rate of change may indicate a rotor position not in alignment with the actual rotor position and whether it is in advance of, or retreated from, the predicted position.

EP2712075 discloses a method to control the rotor position in a reluctance machine. The method involves energising the phase winding so to move the rotor relative to the stator, freewheeling current through the phase winding over a freewheeling period, sampling rate of change of phase current and amplitude of phase current, de-energising the phase winding and computing the angular position of the rotor.

The present disclosure is directed, at least in part, to improving or overcoming one or more aspects of the prior art system.

BRIEF SUMMARY OF THE INVENTION

In a first aspect, the present disclosure describes a method to control the rotor position in a reluctance motor comprising a stator, a rotor movable relative to the stator and at least one phase winding coupled to the stator. The method comprises the steps of: energising the phase winding to an energised state so as to move the rotor relative to the stator; switching the phase winding between the energised state and a freewheeling state over a pulsing period to produce a plurality of phase current pulses wherein the phase current freewheels in the freewheeling state over a freewheeling period of each current pulse; sampling rates of change of phase current and amplitudes of phase current during a plurality of freewheeling periods; de-energising the phase winding; and computing the angular position of the rotor.

In a second aspect, the present disclosure describes a system to control the rotor position in a reluctance motor comprising a stator, a rotor movable relative to the stator and at least one phase winding coupled to the stator. The system comprising: switches to energise the phase winding to an energised state so as to move the rotor relative to the stator and to switch the phase winding between the energised state and a freewheeling state over a pulsing period to produce a plurality of phase current pulses wherein the phase current freewheels in the freewheeling state over a freewheeling period of each current pulse; a firing controller configured to command the sampling of rates of change of phase current and amplitudes of phase current during a plurality of freewheeling periods; and a microprocessor to compute the angular position of the rotor.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

This disclosure generally relates to a method and a system to monitor and control rotor position in a reluctance motor.

Figure 1:
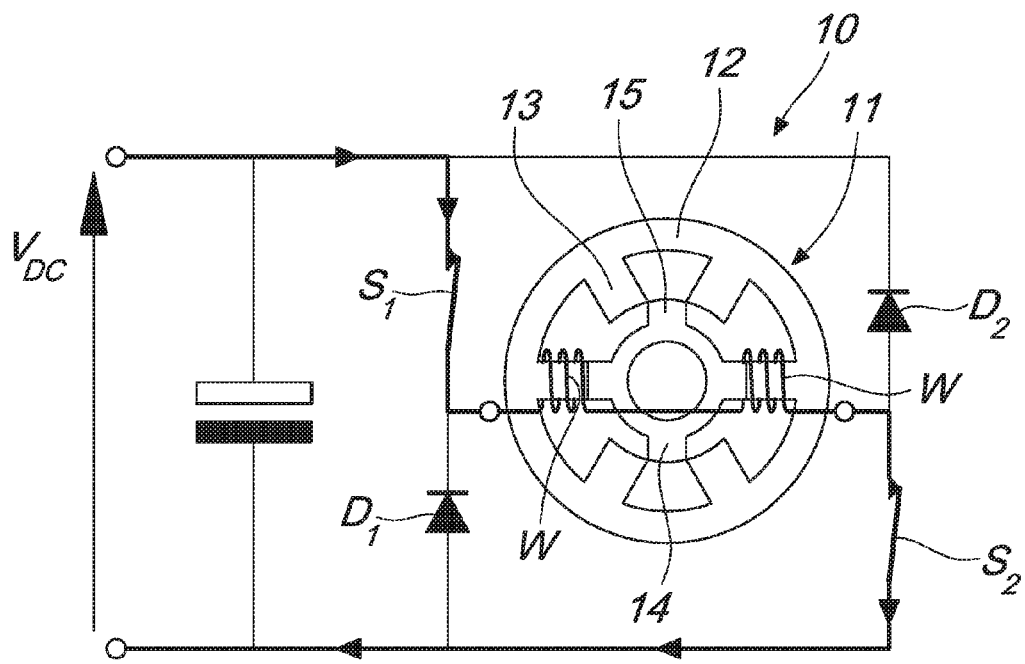
FIG. 1 is a schematic representation of an asymmetric half-bridge in phase energisation mode according to the present disclosure.
Figure 2:
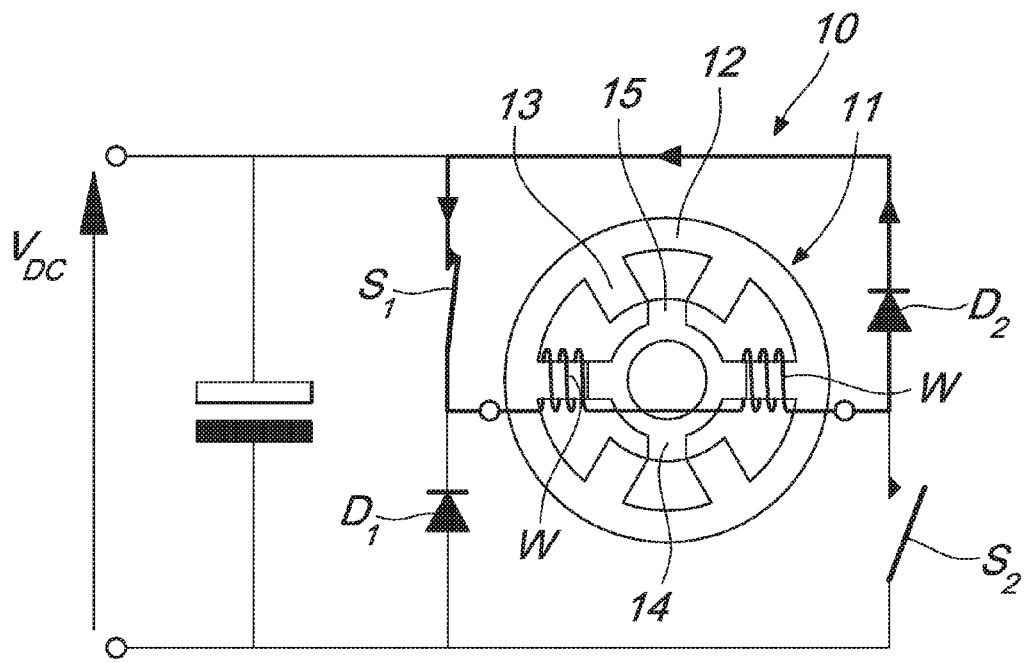
FIG. 2 is a schematic representation of an asymmetric half-bridge in freewheeling mode according to the present disclosure.
Figure 3:
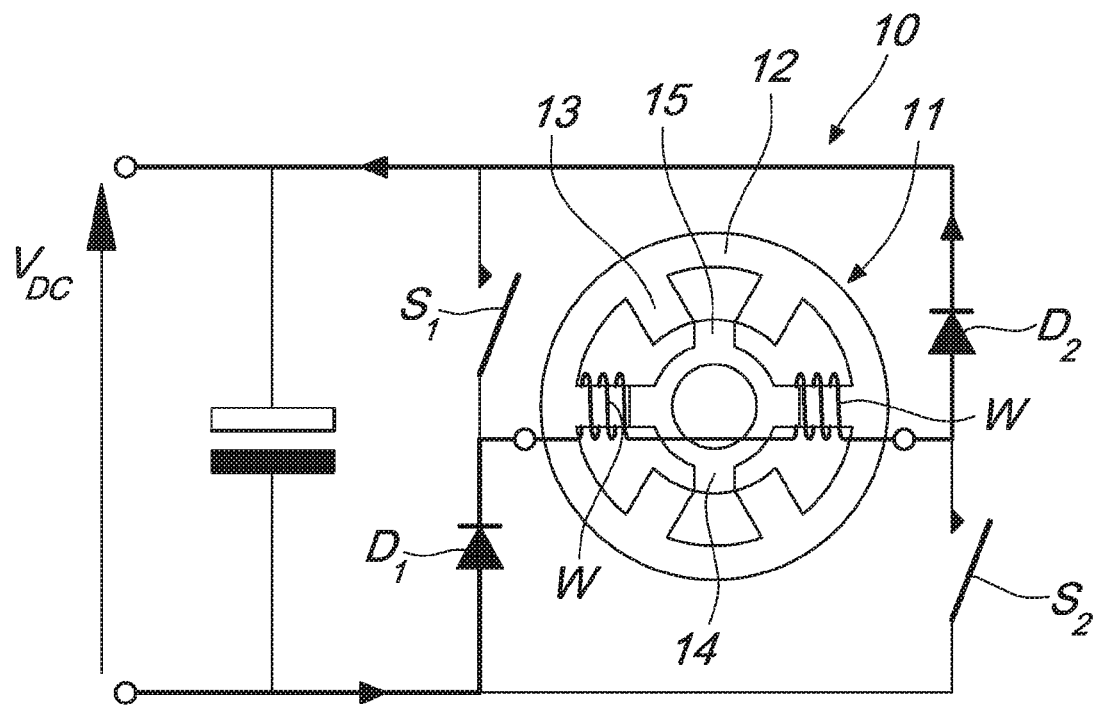
FIG. 3 is a schematic representation of an asymmetric half-bridge in de-energised mode according to the present disclosure.

FIGS. 1 to 3 illustrate an exemplary asymmetric half bridge power converter circuit 10 in three modes of operation for a switched reluctance motor 11 having a stator 12 having at least one stator pole 13 and a rotor 14 having at least one rotor pole 15. A phase winding W may be connected between a switch S1 associated with a diode D1 and a switch S2 associated with a diode D2. In an embodiment, the switched reluctance motor 11 may comprise plurality of phase windings W. The plurality of phase windings W may be provided on a plurality of stator poles 13.

The method of the present disclosure may be implemented in the switched reluctance motor 11 wherein the rotor 14 may be movable relative to the stator 12. The at least one rotor pole 15 may be movable relative to the at least one stator pole 13. At least one phase winding W may be coupled to the stator 12 to control the rotor position. In an embodiment, a plurality of phase windings W may be coupled to the stator 12 to control the rotor position.

The method may comprise the steps of energising the phase winding W to an energised state so as to move the rotor 14 relative to the stator 12; switching the phase winding W between the energised state and a freewheeling state over a pulsing period P to produce a plurality of phase current pulses wherein the current freewheels in the freewheeling state over a freewheeling period F of each current pulse; sampling rates of change of phase current and amplitudes of phase current during a plurality of freewheeling periods; de-energising the phase winding W; and computing the angular position of the rotor 14.

The free-wheeling period F may be of variable duration. The duration of the variable free-wheeling period F may be dependent on a controller. In an embodiment, the duration of the variable free-wheeling period F may be dependent on motor speed, rotor position, upper and lower threshold currents. In an alternative embodiment, the free-wheeling period F may be of variable duration when phase current is undergoing hysteretic current chopping. The freewheel period F may be of variable duration in order to keep a constant current band over the energisation cycle independent of applied current, phase inductance variation and speed.

In a further embodiment, the freewheel period F may be of fixed duration. The duration of the fixed free-wheeling period F may be dependent on a controller. With reference to FIG. 1, the phase winding may be energised from a DC source by closing switches S1 and S2 in the circuit 10 so that current may flow through the phase winding W to move the rotor 14 relative to the stator 12. The phase winding W may be in an energised state when switches S1 and S2 are closed.

With reference to FIG. 2, the phase winding W may be in a freewheeling state when either one of switches S1 and S2 is open. In the freewheeling state the phase current may be freewheeled through the phase winding W over each freewheeling period F.

Freewheeling current in a switched reluctance machine is generally known. Freewheeling current through a phase winding W may be effected by setting the voltage across the phase winding of a switched reluctance machine to zero. The voltage may be set to almost zero by providing a short-circuit path across the ends of the phase winding so as to circulate current around the phase winding.

Freewheeling may be used in reducing switching losses when operating the switched reluctance motor 11 at low speeds with constrained and pulsed phase current. A small amount of freewheeling may reduce acoustic noise production through its current profiling capability at higher operating speeds.

With reference to FIG. 3, the phase winding W may be de-energised by opening both switches S1 and S2 in the circuit 10 so that no current may flow through the phase winding W. The phase winding W may be in a de-energised state when switches S1 and S2 are open. In the de-energised state, current will flow through phase winding W via D1 & D2 until the flux in the switched reluctance motor 11 drops to zero.

Figure 4:
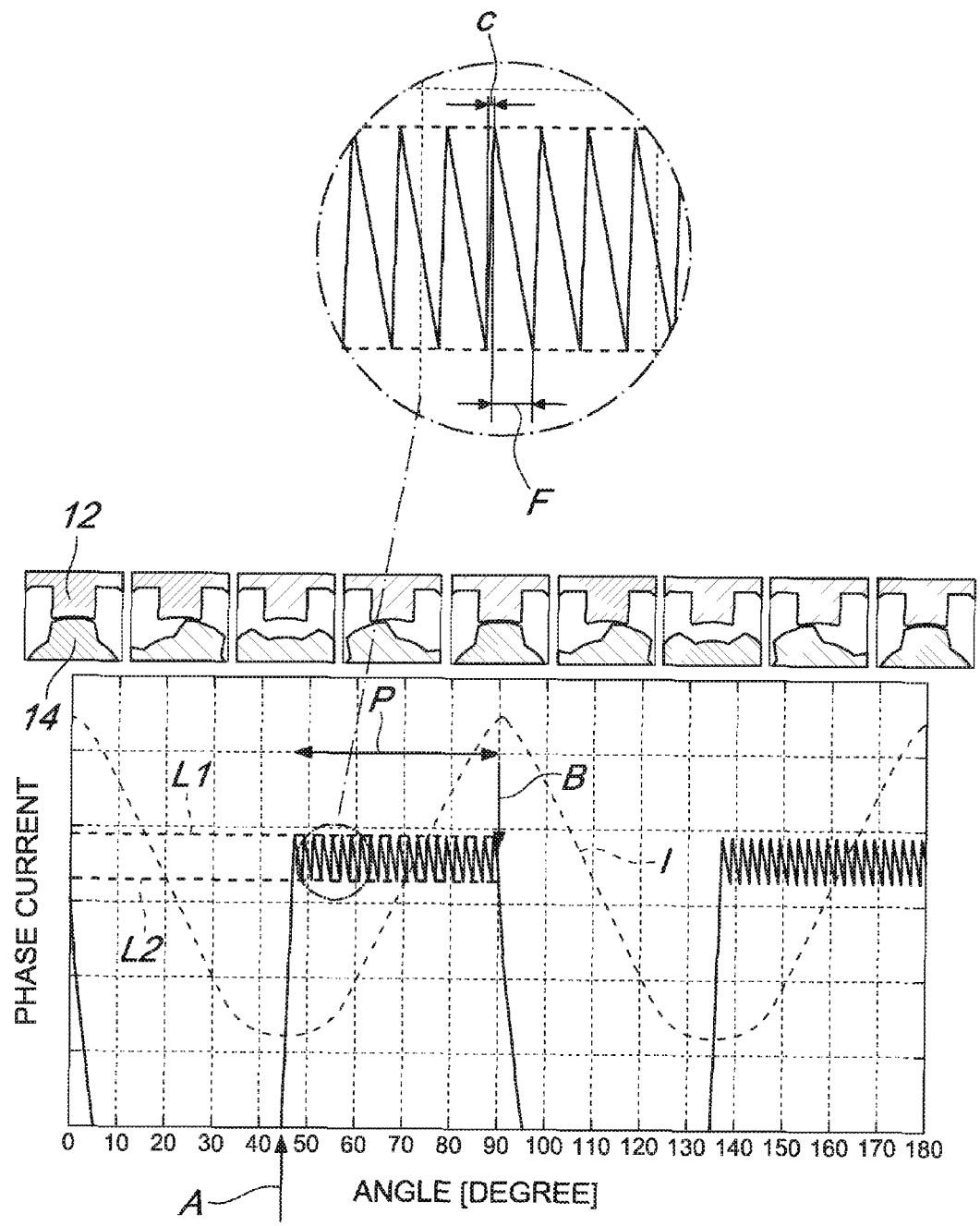
FIG. 4 is a graph showing a phase current wave-form according to the present invention.

FIG. 4, illustrates a phase current wave form of a 6/4 motor as a non-limiting example. The pulsed phase current wave-form may be typical for reluctance motors at a start phase and at low-speed. A voltage may be applied across the winding W (not shown). The applied voltage may increase phase current rapidly over a relatively short interval. The phase winding W may be at an energised state. The inductance may be small and almost constant.

In an embodiment, voltage may be applied across the winding W at the unaligned position A of the rotor 14 relative to the stator 12. At the unaligned position A the at least one rotor pole 15 may not be aligned to the at least one stator pole 13. The unaligned position may be defined as the position at which the rotor pole 15 is centred exactly between two stator poles 13.

In the exemplary 6/4 motor, the unaligned positions A may be at 45 degrees, 135 degrees, 225 degrees and 315 degrees. The unaligned position A is specific for motors with a specific stator pole/rotor pole configuration. For example, in an 8/6 motor the unaligned positions A may be separated by 60 degrees.

In an alternative embodiment, the phase winding W may be switched to the energised state near or at the start of increasing inductance interval. The phase winding W may be switched to the energised state at minimum inductance. The phase winding W may be switched to the energised state near or at the end of the peak reluctance. The phase winding W may be switched to the energised state at maximum reluctance. In a further embodiment, the unaligned position may be the position with minimum inductance.

The phase current may increase to an upper current limit L1. At the upper current limit L1, the phase winding W may be switched from the energised state to the freewheeling state. The phase current may freewheel through the phase winding W till the phase current reaches a lower current limit L2. The freewheeling period F may be a period for the current to decay from the upper current limit L1 to the lower current limit L2. At the lower current limit L2, the phase winding W may be switched from the freewheeling state to the energised state. The phase current may increase from the lower current limit L2 to the upper current limit L1 over a current increase period C. A single phase current pulse may comprise a freewheeling period F and a current increase period C. In an embodiment, the freewheeling period F may precede the current increase period C in a single phase current pulse.

The phase current may be maintained as a plurality of phase current pulses between the upper current limit L1 and the lower current limit L2 over the pulsing period P. The pulsing period P may initiate at the first switch from the energised state to the freewheeling state of the phase winding W. The upper current limit L1 and the lower current limit L2 may be predetermined.

The pulsing phase current may be maintained within a specified hysteresis band by current-feedback chopping control of the power electronic circuit. In this mode of operation, the current and hence the torque are controlled by varying the current chopping level. For an unchanged current chopping level the torque/speed characteristics may be nearly constant.

The phase winding W may be switched to the de-energised state at the end of the pulsing period P. The pulsing period P may terminate at the switch from the energised state to the de-energised state of the phase winding W. In an embodiment, the pulsing period P may terminate after the final current increase period C. The voltage applied across the winding W may be reversed so as to force the current to decay rapidly to zero before the negative torque region where inductance is falling. In an embodiment, phase winding W may be switched to the de-energised state at the aligned position B of the rotor 14 relative to the stator 12. At the aligned position B the at least one rotor pole 15 may be aligned to the at least one stator pole 13.

In the exemplary 6/4 motor, the aligned positions B may be at 0 degrees, 90 degrees, 180 degrees and 270 degrees. The aligned position B is specific for motors with a specific stator pole/rotor pole configuration. For example, in a 8/6 motor the aligned positions B may be separated by 60 degrees.

In an alternative embodiment, the phase winding W may be switched to the de-energised state near or at the end of the increasing inductance interval. The phase winding W may be switched to the de-energised state near or at the end of the peak inductance.

The phase current is pulsed between the energised state and the freewheeling state of the phase winding W over the pulsing period P that may correspond to an angular movement of the rotor 14. The plurality of phase current pulses may be produced during an angular movement of the rotor 14. The plurality of freewheeling periods F may occur during the angular movement of the rotor 14.

The pulsing period P may be dependent on the specific switched reluctance motor 11. The pulsing period P may be a value selected on the basis of the unaligned position A and the aligned position B of the switched reluctance motor 11. The pulsing period P may initiate at the unaligned position A and may terminate at the aligned position B. In an embodiment, the pulsing period P may be selected from the range of 0% to 50% of angular movement of the rotor 14.

In an embodiment, for starting and low speeds of the switched reluctance motor 11, the pulsing period P may be 50 percent of the angular separation of the rotor 14. The pulsing period P may be between adjacent stator 12/rotor 14 pole aligned positions For example, the pulsing period P for the exemplary 6/4 motor may be 45 degrees. The torque may be set by the current amplitude through chopping or PWM voltage control.

The pulsing period P may be effected during a phase inductance cycle. Pulsing of the phase current may be performed during any part of the phase inductance cycle. A phase inductance cycle may be the period of inductance variance in the switched reluctance motor 11. The plurality of phase current pulses may be produced during the phase inductance cycle. The plurality of freewheeling periods F may occur during the phase inductance cycle.

In an embodiment, for a given speed the angle of the rotor 14 at which the both switches S1 and S2 are turned-off and the angle of the rotor 14 at which one switch S1, S2 is turned-off may be characterised. The shaft power may be increased by advancing the angle at which both switches S1 and S2 are turned-on for the first time, and increasing the duration of the pulsing period P. The shaft power may be increased by increasing the upper current limit L1, the lower current limit L2 or both the upper current limit L1 and the lower current limit L2.

At a given speed, the energisation of the phase winding W may be adjusted until the rate of change of phase current and amplitude of phase current may match the required turn-off angle (angle of the rotor 14 at which either both switches S1 and S2 are turned-off or at which one switch S1, S2 is turned-off) point for that speed.

The characterisation may be performed for a switched reluctance machine to establish reference angular positions of the rotor 14 based on the turn-off points prior to commencement of operation. The reference rotor angular positions may be used to compare the angular positions of the sampled rate of change of phase current and amplitude of phase current. The reference rotor angular positions may enable optimal control of the switched reluctance machine.

The rates of change of phase current and amplitudes of phase current may be sampled at an instantaneous interval. The sampling interval may be of the order of a microsecond. The sampling interval may be determined by an analogue to digital converter used in a control circuit.

Figure 5:
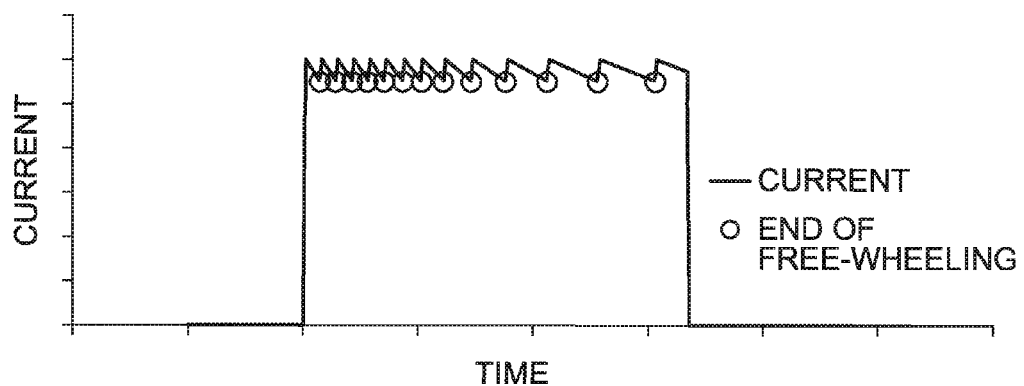
FIG. 5 is a graph of a multiply pulsed phase current wave-form wherein sampling points of the rates of change of phase current and amplitudes of phase current are indicated.

With reference to FIG. 5, sampling rates of change of phase current (current gradient) and amplitudes of phase current may be performed at or near the end of the freewheeling periods F. Sampling may be performed immediately prior to the start of energisation of the phase winding W. Sampling may be triggered by a gate signal transition. Noise in the samples may be reduced through a propagation delay in the gate drive circuitry. Sampling rate of change of phase current and amplitude of phase current may be performed at a sampling point before both switches S1 and S2 are closed.

In an embodiment, sampling rates of change of phase current and amplitudes of phase current may be performed prior to the respective transitions from the freewheeling state to the energised state of the phase winding W. In an alternative embodiment, the sampling points may be selected based on rotor positions corresponding to the transitions from the freewheeling state and the energised state. In yet an alternative embodiment, sampling rates of change of phase current and amplitudes of phase current may be performed at or near the predetermined lower current limit L1.

Sampling rates of change of phase current and amplitudes of phase current may be performed at a required number of freewheeling periods F. Sampling rates of change of phase current and amplitudes of phase current may be performed at a required portion of the pulsing period P. Sampling rates of change of phase current and amplitudes of phase current may be performed at a plurality of portions of the pulsing period P. In an embodiment, the plurality of portions may be discontinuous.

In an embodiment, sampling rates of change of phase current and amplitudes of phase current may be performed at at least the final 3 freewheeling periods F. In an alternative embodiment, sampling rates of change of phase current and amplitudes of phase current may be performed at at least the initial 3 freewheeling periods F. In a further alternative embodiment, sampling rates of change of phase current and amplitudes of phase current may be performed at the at the initial 3 freewheeling periods F and the final 3 freewheeling periods F. In yet a further alternative embodiment, sampling rates of change of phase current and amplitudes of phase current may be performed at each freewheeling period F of the plurality of current pulses P.

Figure 6:
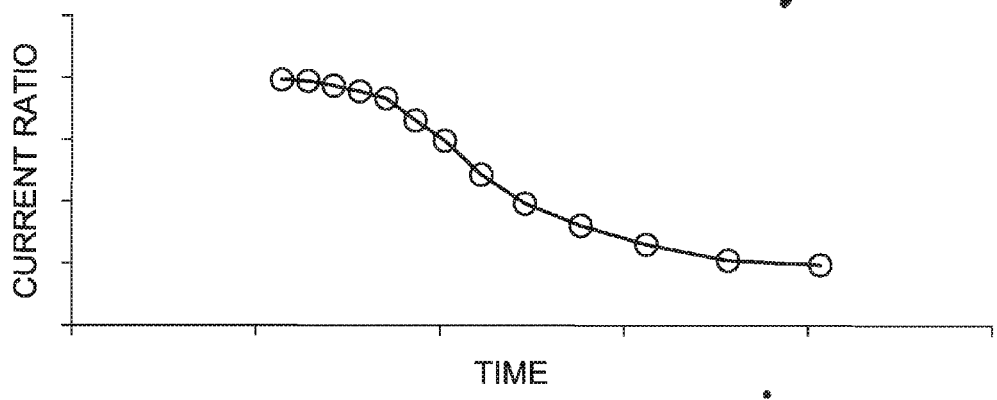
FIG. 6 is a graph of the sampled current ratios plotted against time for a single pulsing period.

FIG. 6 is a graph of the ratio of the current gradient to the current amplitude of each sample (current ratio) over rotor angle. Each current ratio may correspond to an individual current gradient sample obtained from each sampling point at the respective freewheeling period F (denoted by circles in FIG. 5).

Figure 7:
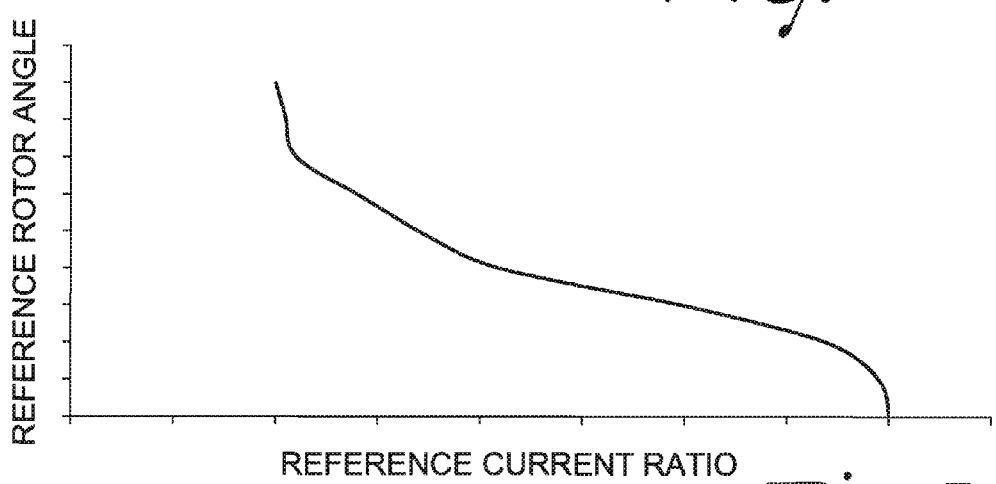
FIG. 7 is a graph exemplifying the relationship, for a given motor speed, of reference rotor angle and the current ratio.
Figure 8:
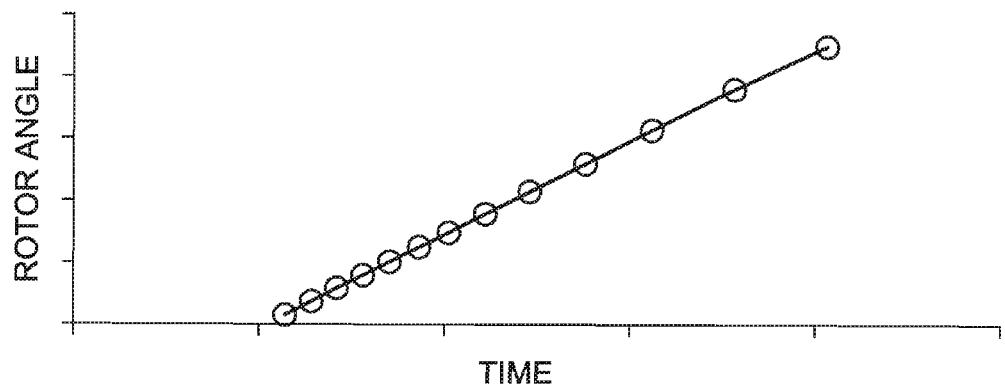
FIG. 8 is a graph of rotor angles over time.

FIG. 7 is a plot of the reference current ratios against rotor angle for a particular motor speed. The graph may be generated from characterising the switched reluctance motor 11. The relationship allows the current gradients ratios plotted in FIG. 6 to be converted to a rotor angle. FIG. 8 illustrates that rotor angles generated from the current gradients ratios (through the graph of FIG. 7).

The sampled rates of change of current gradient, current amplitudes or ratio of current gradient to current amplitude (current ratio) may be compared against previously obtained characteristics of current amplitude, rates of change of current gradient or current ratio against rotor position of the switched reluctance motor 11. Any offset between the measured value and the characterised or reference value may be used to estimate the error between actual and estimated rotor position in order to correct the error.

The rates of change of phase current and amplitudes of phase current may be sampled in order to compute the angular position of the rotor 14. The sampled rates of change of phase current and amplitudes of phase current may be compared with reference rates of change of phase current and amplitudes of phase current in order to determine whether there is an angular error in the rotor position. In an embodiment, computing the angular position of the rotor 14 further comprises calculating the ratios of the rates of change of the phase current gradient to the respective amplitudes of phase current.

The sampling points may be selected based on a rotor position that corresponds to a transition between energy states, i.e. transition between energised and freewheeling state. The sampling points may be selected on the basis of optimal operation of the switched reluctance motor 11.

Figure 9:
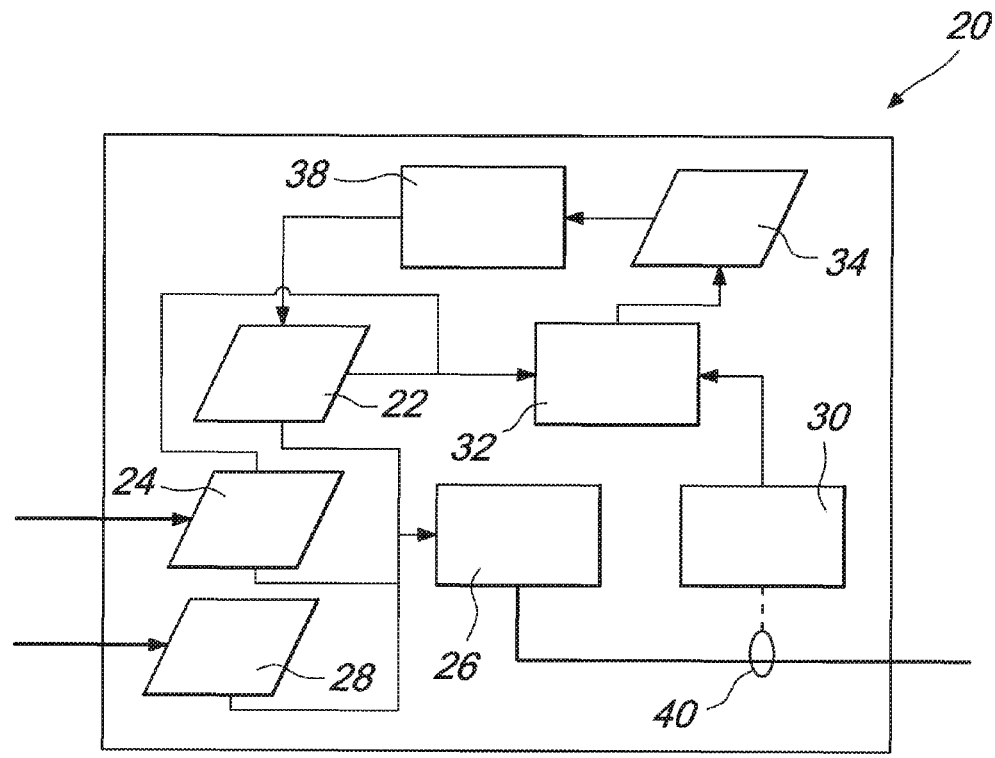
FIG. 9 is a schematic diagram illustrating a control circuit according to the present disclosure.

FIG. 9 is a schematic diagram of a control circuit 20 for implementing a method of monitoring rotor position in a reluctance machine. The control circuit 20 may be incorporated in the reluctance motor 11 comprising the stator 12, the rotor 14 that is movable relative to the stator 12 and the at least one phase winding W coupled to the stator 12 to control the rotor position. The control circuit 20 may control switches S1, S2 that are actuatable for energisation of the phase winding W to move the rotor 14 relative to the stator 12, to freewheel the phase current through the phase winding W over a freewheeling period and to de-energise the phase winding W.

The control circuit 20 may use information of current angular position estimate 22, current motor speed 24 and motor torque demand 28. A firing controller and power electronics 26 (firing controller) may receive the foregoing information to control the phase current by opening and closing of switches S1, S2.

The firing controller 26 may command the sampling of rates of change of phase current and amplitudes of phase current at or near the end of the selected freewheeling periods. In an embodiment, the firing controller 26 may command the sampling of rates of change of phase current and amplitudes of phase current at the transition from the selected freewheeling state to the energised state of the phase winding W. In an alternative embodiment, the firing controller 26 may command the sampling of rates of change of phase current and amplitudes of phase current to be carried out at or near the start of the respective energisation of the phase winding W.

Phase current sensing may be performed by a current sensor 40. The output signal of the current sensor 40 may indicate the respective amplitude of the phase current. The amplitude of the phase current may be used to compute the respective rate of change of phase current at the sampling point. The rates of change of phase current (current gradient) may be computed and sent out as an output signal and amplitudes of phase current may be computed and sent out as a further output signal. The output signals of the current gradient and the current amplitude may form the basis for the indication of the position of the rotor 14 relative to the stator 12.

For each sample, the current gradient may be divided by the current amplitude to provide the current ratio giving, over time, a series of values similar to FIG. 6. The sampled current ratios are compared against reference values for the assumed angular position and speed taken from reference data similar to that shown in FIG. 7. Any offset between the sampled value and the reference value may be used to estimate the error in the assumed angular position. The error may be used to update the estimated angular position of the rotor 14.

The firing controller 26 may command the current sensor 40 to perform sampling as the sampling period is dependent upon the timing of the switches S1 and S2. The current sensor 40 conducts sampling at a time determined by the firing controller 26.

Current sensor 40 may be a physical current sensor, such as a Hall effect device or resistor having a differential op-amp. An additional differentiator may be required for determining rate of change of phase current. The additional differentiator may be an op-amp circuit. The rate of change of phase current may be determined by initially double sampling in a micro and then computing rate of change of phase current.

Sampling of rates of change of phase current and amplitudes of phase current may be performed along the circuit comprising the phase winding W and the switches S1 and S2. Sampling of rate of change of phase current and amplitude of phase current may be performed at the phase winding W, or near the switches S1 and S2. Current ratio measurement module 30 may calculate the current ratio after the sampling of rates of change of phase current and amplitudes of phase current.

Current ratio comparison module 32 may compare the calculated current ratio with reference values. If the error between the rate of change of phase current and the reference rate of change of phase current for the given current amplitude is zero, then the error in rotor position, may be zero. In an embodiment, if the error between the sampled current ratio and the reference current ratio is zero, then the error in the rotor position may be zero. Offset module 34 may log any offset between the expected and actual current ratio.

If there is an error in rotor position then the positional error may be applied to the current angular position estimate 22 through the angular position updater 38. In an embodiment, the current ratio error signal feedback (output from current ratio comparison module 32 and recorded in offset module 34) may be sent to an angular position updater. The positional error signal may be used to update the current angular position estimate 22.

The updated angular position may be sent to both the firing controller and power electronics 26 (to ensure correct angular alignment of the pulsing period) and to the current ratio comparison module 32 (to allow the appropriate expected phase current values to be selected for comparison with the measure value).

In a potential embodiment (not shown) whereby the controller operates with an estimated, rather than measured, motor speed 24 the estimated speed may be updated based on the rotor position error. If the rotor position error indicates the rotor 14 may be in advance of the expected position, the rotor 14 may be rotating faster than previously estimated. If the rotor position error indicates the rotor 14 is retarded of the expected position, the rotor 14 may be rotating slower than previously estimated.

The firing controller 26 may include a free-running timer which is used to set the angular position of switching firing events. By deriving rotor position error from the current rate of change and the amplitude of phase current the timer may be reset for each phase. Then, for a given speed, the firing controller 26 may use the corrected assessment of the rotor position in one phase and a predetermined data of the firing control strategy in order to determine the point of transition from freewheeling state to the energisation state.

For a given speed and motor torque, the firing controller 26 may determine the time at which freewheeling should end according to the firing control strategy. At that time the firing controller 26 may actuate the measurement of current magnitude and rate of change.

When computing rate of change of phase current and determining amplitude of phase current or current ratio (ratio of current gradient to current amplitude), the signals corresponding to rate of change of phase current signal, amplitude of phase current signal and current ratio may be processed by a processor. The processor may be programmed with an equation or a look-up table to determine the rotor angular position. The equation or a look-up table may correspond to the graph of FIG. 7 for a given motor speed.

A system to control the rotor position in a reluctance motor comprising a stator 12, a rotor 14 movable relative to the stator 12 and at least one phase winding W coupled to the stator 12. The system may comprising switches S1, S2 to energise the phase winding W to an energised state so as to move the rotor 14 relative to the stator 12 and to switch the phase winding W between the energised state and a freewheeling state over a pulsing period to produce a plurality of phase current pulses wherein the phase current freewheels in the freewheeling state over a freewheeling period of each current pulse; a firing controller 26 configured to command the sampling of rates of change of phase current and amplitudes of phase current during a plurality of freewheeling periods; and a microprocessor to compute the angular position of the rotor 14.

The firing controller 26 may be configured to receive a speed error signal from a speed controller or a speed sensor. The system may comprise a timer to estimate the position the rotor 14.

The skilled person would appreciate that foregoing embodiments may be modified or combined to obtain the method or system of the present disclosure.

INDUSTRIAL APPLICABILITY

This disclosure describes a method and a system of controlling the rotor position in a switched reluctance motor 11. The method may include monitoring and estimating the rotor position. The method may be employed during starting of the switched reluctance motor 11. The method may be employed in low speed operation of the switched reluctance motors 11. Low speed reluctance motors may be for example reluctance motors that are not phase current limited under single pulse operation (i.e. require current chopping). Low speed reluctance motors may be for example reluctance motors where the peak phase current is limited by current chopping. At initiation and at lower speeds, the current in a switched reluctance motor 11 is constrained by chopping. The method involves multiple freewheel periods that correspond to the current chopping. A plurality of instantaneous samples of the rate of change of phase current and amplitudes of phase current may be obtained in respect to the current chopping. The samples may be obtained during the freewheel periods. The number of samples may be varied.

In an embodiment, the number of samples may be varied as a trade-off between angular position estimation accuracy and controller processing requirements. The method may involve computation of the rotor position that is based on the sampled rates of change of phase current and amplitudes of phase current over a period of time.

Freewheeling may be useful in reducing the switching losses when operating the reluctance motor at low speed with constrained, chopping phase current. The rate of change of current is observed at a plurality of instantaneous intervals of switching phases between the freewheeling mode and the fully energized mode. Then the predetermined characteristics of the reluctance machine may be referenced to compute the angular position of the rotor.

The method overcomes the need for an electro-mechanical rotor position sensor, which may introduce additional moving components causing significant challenges in high-speed, compact or harsh environment applications. Sensorless control may be implemented via control software and a simple and robust electronic current sensor in the power electronic circuitry so as to exclude moving parts.

The method may improve accuracy of rotor position computation as a plurality of rates of change current and amplitudes of phase current is used along with a predetermined model of the non-linear electro-magnetic characteristics of the reluctance motor. Through the use of phase current freewheeling, a flux linkage may not be required. An advantage is that the continuous computation of flux linkage, which is equal to the integral of the DC link voltage over time, may not be required to compute the angular position of the rotor. The method has the advantage of reduced complexity of DC link voltage measurement and reduced computational demands. The measurement of rotor position by use of rates of change of phase current may avoid the need for the use of DC link voltage measurement.

The method may be implemented to control the switched reluctance motors operating in both motoring mode or in generating/braking mode. The described control method can also be used for generating mode through offset of the aligned and unaligned positions of the respective rotor and stator poles and the substitution of alternation between "energised" and "freewheeling" with alternation between "off" and "free-wheeling". A separate set of look up tables for generating current ratio for generating will be used and the current ratio offset compensator may have different setting for generating than for motoring operation.

The method may be implemented in machines having switched reluctance motors. The method may be implemented in industrial machines or off-highway vehicles powered by an industrial, heavy-duty diesel engine, equipped with the Electric Turbo Assist system, or vacuum cleaners.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. A method to control the rotor position in a reluctance motor comprising a stator, a rotor movable relative to the stator and at least one phase winding coupled to the stator, the method comprising the steps of:
   energising the phase winding to an energised state so as to move the rotor relative to the stator;
   switching the phase winding between the energised state and a freewheeling state over a pulsing period to produce a plurality of phase current pulses wherein the phase current freewheels in the freewheeling state over a freewheeling period of each current pulse;
   sampling rates of change of phase current and amplitudes of phase current during a plurality of freewheeling periods;
   de-energising the phase winding; and
   computing the angular position of the rotor.

2. The method of claim 1 wherein the plurality of freewheeling periods comprises at least the final 3 freewheeling periods.

3. The method of claim 1 wherein the plurality of freewheeling periods comprises at least the initial 3 freewheeling periods.

4. The method of claim 1 wherein the plurality of freewheeling periods comprises each freewheeling period of the plurality of current pulses.

5. The method of claim 1 wherein the step of computing the angular position of the rotor comprises the step of determining the angular error in the rotor position by comparing sampled rates of change of phase current and amplitudes of phase current with reference rates of change of phase current and amplitudes of phase current.

6. The method of claim 5 wherein step of computing the angular position of the rotor further comprises calculating the ratios of the rates of change of the phase current gradient to the respective amplitudes of phase current.

7. The method of claim 6 wherein sampling rates of change of phase current and amplitudes of phase current is performed at the respective transitions from the freewheeling state to the energised state of the phase winding.

8. The method of claim 7 wherein sampling points are selected based on rotor positions corresponding to the transitions from the freewheeling state and the energised state.

9. The method of claim 1 wherein sampling rates of change of phase current and amplitudes of phase current is performed at or near the end of the freewheeling periods.

10. The method of claim 1 comprising the step of switching from the energised state to the freewheeling state when the current reaches an upper current limit.

11. The method of claim 1 comprising the step of switching from the freewheeling state to the energised state when the current reaches a lower current limit.

12. The method of claim 11 wherein sampling rates of change of phase current and amplitudes of phase current is performed at or near the lower current limit.

13. The method of claim 1 wherein the pulsing period is selected from the range of 0% to 50% of angular movement of the rotor between adjacent stator rotor pole aligned positions.

14. A system to control the rotor position in a reluctance motor comprising a stator, a rotor movable relative to the stator and at least one phase winding coupled to the stator, the system comprising:
   switches to energise the phase winding to an energised state so as to move the rotor relative to the stator and to switch the phase winding between the energised state and a freewheeling state over a pulsing period to produce a plurality of phase current pulses wherein the phase current freewheels in the freewheeling state over a freewheeling period of each current pulse;
   a firing controller configured to command the sampling of rates of change of phase current and amplitudes of phase current during a plurality of freewheeling periods; and
   a microprocessor to compute the angular position of the rotor.

15. The system of claim 14 wherein the control circuit is configured to receive an estimated motor speed error signal from a speed controller or a speed sensor.

* * * * *